Patented Apr. 17, 1951

2,549,683

UNITED STATES PATENT OFFICE 2,549,683

OXY SUBSTITUTED AMINOINDANONES

Richard V. Heinzelmann, Kalamazoo, Mich., assignor to The Upjohn Company, Kalamazoo, Mich., a corporation of Michigan No Drawing. Application September 29, 1948,
Serial No. 51,869

6 Claims. (Cl. 260—570.5)

This invention relates to salts of aminoindanones, particularly to acid addition salts of substitution derivatives of 2-aminoindanone-1 wherein the substituents are on the aromatic ring of the indane nucleus.

The compounds of the invention can be described as the acid addition salts of substituted 2-aminoindanones-1 wherein the substituents are on the aromatic ring of the indane nucleus and are from the group consisting of the monohydroxy, monomethoxy, ortho-monohydroxy-monomethoxy, orthodimethoxy and methylene-orthodioxy radicals. Although the invention will be described with particular reference to the hydrogen chloride salts, salts of other acids, such as of hydrobromic, citric, propionic, succinic, phosphoric and many other acids, can also be prepared and are contemplated by the invention.

Members of the new class of acid addition salts of substituted 2-aminoindanones-1 have been prepared and physical properties determined whereby they can be identified. Certain of the new compounds are of value for their effect in the relaxation of constricted bronchi and upon the blood pressure and as intermediates in the preparation of still other new compounds having similar effects. Certain of such other new compounds are described and claimed in concurrently filed co-pending applications, Serial Nos. 51,870 and 52,120.

It is known that a salt of 2-aminoindanol-1 is formed when 2-isonitrosoindanone-1 is reduced catalytically under certain conditions. However, no procedure has been described whereby the reduction of a substituted 2-isonitrosoindanone-1 can be carried out to produce a substituted 2-aminoindanone-1 or its acid addition salt nor have these compounds been prepared in other ways and described.

It has now been found that a 2-isonitrosoindanone-1 having substituents on the aromatic ring from the group consisting of the monohydroxy, monomethoxy, ortho-monohydroxy-monomethoxy, ortho-dimethoxy and methylene-orthodioxy radicals can, under the proper conditions, be reduced with hydrogen in such fashion that the isonitroso group is selectively reduced to the amino group without substantial effect upon the keto group. The reaction is carried out in an acidic medium, such as alcoholic hydrogen chloride, and the isonitrosoindanone is subjected therein to the action of hydrogen under the influence of a suitable catalyst. Suitable catalysts include active palladium supported on charcoal and platinum oxide or reduced platinum oxide similar to that generally referred to as the Adams catalyst. Anhydrous hydrogen chloride or other suitable acid is included in the reaction mixture in amount sufficient to form the addition salt of the aminoindanone as fast as it is formed. The hydrogenation is carried out under super-atmospheric pressure, preferably at a pressure of at about three atmospheres. Although the reduction proceeds at ordinary room temperature, it is preferably carried out at from about 40° to about 70° C. to shorten the time required. The temperature range is, however, not critical.

When the calculated amount of hydrogen has been absorbed, i. e. two mols of hydrogen for each mol of isonitroso compound, the hydrogenation is discontinued and the acid addition salt of the aminoindanone recovered in suitable fashion. One convenient way of recovering the aminoindanone salt, some of which generally separates in crystalline form during the progress of the hydrogenation, consists in adding additional alcohol and warming, if desired, to dissolve the salt and filtering the solution to remove the catalyst. The filtrate can then either be concentrated and the salt crystallized or the salt can be precipitated by diluting the filtrate with a relatively large proportion of ether, ethyl acetate or other suitable liquid and cooling. By either procedure, the acid addition salt of the substituted 2-aminoindanone-1 is obtained in high yield in the form of pure crystals.

The hydrochlorides and other acid addition salts of the substituted 2-aminoindanone-1 are stable compounds most of which melt with decomposition. When in contact with the skin or with cellulosic material they produce a bright red color unless a slight excess of acid is present.

The substituted isonitrosoindanones from which the compounds of the invention can be obtained are prepared readily according to the method of Levin and Hartung, J. Org. Chem. 7, 408 (1942), by the simultaneous addition under anhydrous conditions of an alkyl nitrite and hydrogen chloride to an ethereal solution of an indanone-1 having the desired substituent in the aromatic nucleus.

Compounds contemplated by the invention which can be prepared by the methods given include, among others, 2-amino-4-hydroxyindanone-1 hydrochloride, 2-amino-5-hydroxyindanone-1 hydrochloride, 2-amino-5-hydroxyindanone-1 hydrobromide, 2-amino-5-hydroxyindanone-1 sulfate, 2-amino-5-hydroxyindanone-1 propionate, 2-amino-5-hydroxyindanone-1 phosphate, 2-amino-5-hydroxyindanone-1 citrate, 2-amino-5-hydroxyindanone-1 benzoate, 2-amino-6-hydroxyindanone-1 hydrochloride, 2-amino-7-hydroxyindanone-1 succinate, 2-amino-5-methoxyindanone-1 phosphate, 2-amino-6-methoxyindanone-1 hydrochloride, 2-amino-7-methoxyindanone-1 hydrochloride, 2-amino-4-hydroxy-5-methoxyindanone-1 hydrochloride, 2-amino-5-hydroxy-4-methoxyindanone-1 hydrochloride, 2-amino-5-hydroxy-6-methoxyindanone-1 hydrochloride, 2-amino-6-hydroxy-5-methoxyindanone-1 hydrochloride, 2-amino-6-hydroxy-7-methoxyindanone-1 hydrochloride, 2- amino-7-hydroxy-6-methoxyindanone-1 hydrochloride, 2-amino-4,5 dimethoxyindanone-1 hydrobromide, 2-amino-5,6-dimethoxyindanone-1 hydrochloride, 2-amino-6,7-dimethoxyindanone-1 butyrate, 2-amino-4,5-methylenedioxyindanone-1 hydrochloride, 2-amino-5,6-methylenedioxyindanone-1 acetate, and 2-amino-6,7-methylenedioxyindanone-1 sulfate.

Certain advantages of the invention are apparent from the following examples which are given by way of illustration only and are not to be construed as limiting.

Example 1

Two grams of active palladium charcoal catalyst was added to a suspension of 9.55 grams of 2-isonitroso-5-methoxyindanone-1 (Chakravarti and Swaminathan, J. Ind. Chem. Soc., 11, 101 (1934)) in 100 milliliters of absolute ethanol containing 5.5 grams of dry hydrogen chloride. The suspension was shaken under a pressure of three atmospheres of hydrogen and at a temperature of 60° C. until two molecular proportions of hydrogen had been absorbed. This required about one to two hours. Additional ethanol was then added and the mixture warmed to dissolve the crystals of 2-amino-5-methoxyindanone-1 hydrochloride which had formed and the catalyst was removed by filtering the hot solution. Ether was added to the filtrate from which, after cooling, 2-amino-5-methoxyindanone-1 hydrochloride separated. The product after crystallization from an alcohol-ether mixture was obtained in the form of white crystals melting with decomposition at 225°–227° C.

Anal.—Calc'd for $C_{10}H_{12}O_2NCl$: C, 56.21; H, 5.66; N, 6.56. Found: C, 56.22; H, 5.56; N, 6.44.

In like manner, from 2-isonitroso-5-hydroxyindanone-1, (M. P. 212°–214° C., obtained from 5-hydroxyindanone-1) there was obtained 2-amino-5-hydroxyindanone-1-hydrochloride melting with decomposition at 275° C.

Anal.—Calc'd for $C_9H_{10}O_2NCl$: C, 54.17; H, 5.05; N, 7.02. Found: C, 54.18; H, 5.10; N, 7.12.

Likewise, there was obtained from 2-isonitroso-7-methoxyindanone-1, (M. P. 250° C. (dec.) obtained from 7-methoxyindanone-1) 2-amino-7-methoxyindanone-1 hydrochloride decomposing at about 250° C.

Anal.—Calc'd for $C_{10}H_{12}O_2NCl$: C, 56.21; H, 5.66; N, 6.56. Found: C, 56.39; H, 5.62; N, 6.47.

There was also obtained from 2-isonitroso-6-methoxyindanone (Johnson and Shelberg, J. Am. Chem. Soc. 67, 1853 (1945)) 2-amino-6-methoxyindanone-1 hydrochloride decomposing between 210° and 232° C. depending upon the rate of heating.

Anal.—Calc'd for $C_{10}H_{12}O_2NCl$: C, 56.21; H, 5.66; N, 6.56. Found: C, 56.32; H, 5.68; N, 6.65.

Similar results are obtained and the corresponding salts prepared using hydrogen bromide, citric acid, propionic acid, phosphoric acid or other convenient acid instead of hydrogen chloride.

Example 2

Two grams of active palladium charcoal catalyst were added to a solution of 22.1 grams of 2-isonitroso-5,6-dimethoxyindanone-1 (Perkin and Robinson, J. Chem. Soc. 1073 (1907)) in 125 milliliters of absolute ethanol containing 11 grams of dry hydrogen chloride. The mixture was shaken at about 40° C. and under hydrogen at about three atmospheres pressure until two molecular proportions of hydrogen had been absorbed. This required about twelve hours. The mixture can be heated to about 60° C., or fresh catalyst can be added to shorten the hydrogenation time, if desired. The suspension was then heated and additional absolute ethanol was added until the 2-amino-5,6-dimethoxyindanone-1 hydrochloride which had precipitated was entirely dissolved and the catalyst was removed by filtration. The catalyst can be re-used, if desired. The addition of ether to the filtrate, followed by cooling, gave 2-amino-5,6-dimethoxyindanone-1 hydrochloride which was further purified by dissolving in alcohol, treating with decolorizing charcoal, filtering, adding ether and cooling. The hydrochloride was thus obtained in the form of pure white crystals.

Anal.—Calc'd for $C_{11}H_{14}O_3NCl$: C, 54.20; H, 5.79; N, 5.74; Cl, 14.56. Found: C, 54.11; H, 5.82; N, 5.82; Cl, 14.54.

In like manner there was obtained from 2-isonitroso-4,5-dimethoxyindanone-1 (Perkin and Robinson, J. Am. Chem. Soc. 2389 (1914)) 2-amino-4,5-dimethoxyindanone-1 hydrochloride melting with decomposition at 185° C.

Anal.—Calc'd for $C_{11}H_{14}O_3NCl$: C, 54.30; H, 5.80; N, 5.76. Found: C, 54.16; H, 6.02; N, 5.48.

In like manner there was obtained from 2-isonitroso-5-methoxy-6-hydroxyindanone-1 (M. P. 240° C. (dec.)) obtained from 5-methoxy-6-hydroxyindanone-1) 2-amino-5-methoxy-6-hydroxy-indanone-1 hydrochloride monohydrate melting with decomposition when immersed in a bath at 300° C.

Anal.—Calc'd for $C_{10}H_{14}O_4NCl$: C, 48.49; H, 5.70; N, 5.66. Found: C, 48.49; H, 5.73; N, 5.73.

Likewise there was obtained from 2-isonitroso-5,6-methylenedioxyindanone-1 (Perkin and Robinson, J. Chem. Soc., 1073 (1907)) 2-amino-5,6-methylenedioxyindanone-1 hydrochloride melting with decomposition at 243° C.

Anal.—Calc'd for $C_{10}H_{10}O_3NCl$: C, 52.80; H, 4.41; N, 6.16. Found: C, 53.05; H, 4.47; N, 5.98.

I claim:

1. An acid addition salt of a substituted 2-aminoindanone-1 wherein the substituents are on the aromatic ring of the indane nucleus and are from the group consisting of the monohydroxy, monomethoxy, ortho-monohydroxy-monomethoxy, ortho-dimethoxy and methylene-orthodioxy radicals.

2. 2-amino-5-methoxyindanone-1 hydrochloride.

3. 2-amino-5-hydroxyindanone-1 hydrochloride.

4. 2-amino-6-methoxyindanone-1 hydrochloride.

5. 2-amino-5,6-dimethoxyindanone-1 hydrochloride.

6. 2-amino-5-methoxy-6-hydroxyindanone-1 hydrochloride.

RICHARD V. HEINZELMANN.

REFERENCES CITED

The following references are of record in the file of this patent:

FOREIGN PATENTS

| Number | Country | Date |
|---|---|---|
| 8,957 | Great Britain | 1912 |
| 747,028 | France | June 9, 1933 |

OTHER REFERENCES

Perkin et al.: "J. Chem. Soc." (London), vol. 95, pp. 1977–1984 (1909).

Heinzelmann et al.: "J. Am. Chem. Soc.," vol. 70, pp. 1386–1390 (1948).